Patented Aug. 7, 1945

2,381,236

UNITED STATES PATENT OFFICE 2,381,236

CHROMIUM RECOVERY

Marvin J. Udy, Niagara Falls, N. Y.

No Drawing. Application August 3, 1940,
Serial No. 351,128

16 Claims. (Cl. 23—56)

This invention relates to the recovery of chromium and has for an object the provision of certain improvements in processes for producing chromium compounds. A particular object of the invention is to provide certain improvements in processes for producing chromate compounds. A further object of the invention is to provide an improved method of treating chromite ores for the production of chromate compounds. The invention further contemplates the treatment of materials containing spinels comprising ferrous oxide, alumina and chromic oxide to produce altered spinel products containing ferrous oxide and alumina in proportions, relatively to chromic oxide, smaller than in the spinels of the original chromium-bearing material and oxidation of the altered spinel products to produce chromate compounds. Another object of the invention is to provide an improved process for recovering alumina from chromite ores.

The invention involves the treatment by oxidation of altered chromium-bearing material in which chromic oxide ($Cr_2O_3$) contained therein is so associated with one or more basic compounds as to facilitate oxidation of the chromic oxide to chromium trioxide ($CrO_3$) and combination of the chromium trioxide thus produced with the one or more basic compounds to form one or more chromates. Alteration of crude chromium-bearing material may be effected by subjecting the material to a fusion treatment in the presence of a basic compound such as lime (CaO). Oxidation may be carried out under any suitable conditions and in the presence of any suitable basic compound capable of combining with chromium trioxide produced in the oxidation treatment. Recovery of the chromate compounds from the associated materials may be accomplished in any suitable manner.

The chromium of chromite ores usually is present in the spinel type mineral, $MgO \cdot FeO$ ($Cr_2O_3 Al_2O_3$), and the gangue materials associated with this mineral in the ore usually contain silica ($SiO_2$), magnesia (MgO) and alumina ($Al_2O_3$). I have found that, in some instances, magnesia in the ore as mined is present in the gangue materials combined with carbon dioxide as magnesium carbonate, but usually the magnesia of the gangue materials is all or largely combined with the silica and alumina, probably as magnesium-aluminum-silicate. In the usual chromite ore, the gangue materials are so widely disseminated and so intimately intermixed with the spinels that a high degree of oxidation of the chromium of the chromite ore in a reasonable period of time is impossible unless the ore is ground virtually to an impalpable powder and carefully and thoroughly mixed with basic compounds like lime and soda ash. Grinding of the natural ore to a degree of fineness such that a substantial recovery of chromium in the form of chromate can be made is expensive, and even under optimum conditions of grinding or subdivision, an excessive amount of lime, or similar reagent or diluent, is required to prevent undesirable sintering or fusion which will interfere with, prevent or inhibit the oxidation reactions. Under optimum conditions with respect to fine-grinding or subdivision of natural chromite ores, according to heretofore customary practices, the roasting or oxidation charges may require lime (CaO) amounting to three and one-half times as much as the ore, by weight. Such charges are undesirably large in volume and weight, and they limit materially the effective capacity of the roasting or oxidizing equipment.

The present invention is based in part on my discovery that chromium-bearing materials of the nature of chromite ore can be made more amenable to treatment for the production of chromate compounds if a charge of the ore and lime in controlled amounts or proportions is heated to a temperature at least sufficiently high to sinter constituents of the charge and the resultant product thereafter is subjected to a decomposition treatment with an alkali metal compound such, for example, as caustic soda (NaOH) or sodium carbonate ($Na_2CO_3$). The heating of the charge of ore and lime may be merely sufficient to bring about a sintering of constituents of the charge or may be sufficiently intense to cause a melting of the charge. The term "fusion treatment" or similar terms, hereinafter sometimes are used as a generic term to refer to a heating treatment which may be of such intensity as merely to sinter constituents of the charge, or sufficiently intense to cause a melting of the charge. The fusion treatment results in bringing magnesia or lime or lime and magnesia into chemical combination with chromic oxide normally chemically combined with ferrous oxide, and in the production of calcium compounds of iron, aluminum, chromium and silicon such, for example, as calcium ferrite, calcium aluminate and calcium silicate. The fusion treatment also is capable of concentrating chromium-bearing minerals into relatively larger particles of high specific gravity which may be separated from associated gangue materials by ordinary concentration methods.

The decomposition treatment with an alkali metal compound appears to effect physical decomposition of calcium compounds of iron, aluminum, chromium and silicon formed in the fusion treatment with the production of simple oxides of those elements.

Products resulting from the fusion and decomposition treatments of the invention may be oxidized effectively in oxidation charges containing substantially smaller amounts of lime or other diluent material than the amounts required to prevent fusion in charges comprising other chromium-bearing materials commonly employed for chromate production. Effective oxidation may be carried out with oxidation charges comprising products resulting from the fusion and decomposition treatments of the invention and containing lime or other diluent material in amount not substantially greater than about fifty percent by weight of the amount of lime or other diluent material required for effective oxidation of charges comprising natural chromite ore.

The product of the fusion treatment may be subjected to the decomposition treatment with an alkali metal compound in any suitable manner. In a preferred process of the invention, the product of the fusion treatment is digested with a caustic aqueous solution of the alkali metal compound at a boiling temperature. The product of the fusion treatment preferably is ground to form a finely divided product consisting largely of particles small enough to pass a 100-mesh screen prior to being subjected to the decomposition treatment. Solutions of any suitable concentrations may be employed. Digestion may be carried out for any period of time necessary to accomplish effective decomposition. Usually, digestion for a period of one hour to one and one-half hours accomplishes effective decomposition. The strength of solution employed will be determined to some extent, at least, by results sought to be accomplished. Thus, for example, if alumina recovery is desired, relatively strong solutions are employed. When recovery of alumina is not desirable, relatively dilute solutions are employed. Solutions containing not more than about twenty percent by weight of the alkali metal compound can be employed to decompose the fused products effectively without dissolving any substantial amounts of alumina contained therein. Solutions containing about twenty-five percent or more of the alkali metal compound can be employed to dissolve alumina effectively with the production of sodium aluminate in solution. In treating ores high in alumina, I prefer to employ strong decomposition solutions to produce solutions of sodium aluminate from which alumina may be recovered by standard methods. In treating ores low in alumina, or when alumina recovery is not commercially feasible, I prefer to employ relatively dilute decomposition solutions containing about ten to twenty percent by weight of the alkali metal compound. Caustic soda and sodium carbonate may be employed with about equal effectiveness.

After digestion of the fused product with the decomposition solution, the product is filtered to separate the solution from the solid decomposed material. The solid residue may be dried and mixed with lime or lime and soda ash, by grinding if necessary, to prepare a charge suitable for oxidation. The separated solution may be returned to the process for further use directly or after suitable treatment for the recovery of any dissolved values.

The product of the fusion treatment may be subjected to the action of the alkali metal compound by mixing the product of the fusion treatment with the alkali metal compound and thereafter heating the mixture to a temperature above the melting temperature of the alkali metal compound. A suitably decomposed product may be obtained by digesting the product of the heat treatment with water and filtering to separate the resulting solution and the solid material.

By fusing chromium-bearing materials containing minerals of the spinel type and thereafter subjecting the product of the fusion treatment to decomposition and concentration treatments in accordance with the invention, I am able to obtain concentrates comprising altered spinel type minerals which altered minerals contain chromic oxide in greater proportions by weight and chromium and iron in higher ratios of chromium to iron than the spinel type minerals of the original chromium-bearing materials. The altered mineral products of my invention may be sufficiently free of ferrous oxide and and alumina to approximate true magnesium chromite in composition or they may contain ferrous oxide and alumina in controlled relatively small amounts.

The invention may be employed in the treatment of chromite ores of any grade, but it is of particular importance with respect to the matter of utilizing the so-called low-grade ores, that is, ores containing low percentages of chromium and ores which contain iron and chromium in ratios of iron to chromium too high to permit them to be utilized for the recovery of chromium for industrial uses in processes of the type employed heretofore for chromium recovery. The invention presents a solution of the problem of utilization of such so-called low-grade ores, a solution of major importance to countries requiring chromium for industrial uses, but having available only deposits of low-grade ores. The invention provides a further specific advantage of importance by permitting the use of combustion furnaces in preliminary fusion treatments to condition chromite ores for subsequent concentration treatments with recovery of high-grade concentrates.

The present invention contemplates the direct utilization for the production of chromate compounds of products resulting from fusion and decomposition treatments of chromite ores and the utilization for the production of chromate compounds of concentrates obtained as the result of concentration treatments of products resulting from fusion and decomposition treatments of chromite ores. Chromate production processes and chromate recovery processes are facilitated by the use of concentrates because of the smaller charges which may be employed and because the absence of gangue materials which normally accompany chromite ores promotes more effective contact of reagents and solvents.

My researches and experiments have indicated that when a chromite ore is fused with lime (calcium oxide) there is a displacement of the magnesia of the silicate portion of chromite ore from its combinations with silica and alumina and displacement, in turn, of the ferrous oxide from the spinel type mineral by the magnesia displaced from its combinations with silica and alumina. It appears, also, that there results a rearrangement of the alumina and silica in the presence of the lime with the production of calcium-aluminum-silicate. The tendency of the alumina ($Al_2O_3$) is to divide between the silicate and chromite portions with a somewhat greater percentage in the silica. When the lime is present in the charge in amount sufficient to displace all of the magnesia combined with silica or to form dicalcium silicate with the silica present in the charge, the product of the fusion treatment will have the characteristic or property of self-disintegration.

When a charge comprising chromite ore is subjected to a fusion treatment in the presence of lime, the ore is altered or converted from a substantially acid-insoluble product to a product which may be dissolved or broken down with acids and which may be decomposed or broken down with alkali metal compounds such as caustic soda and sodium carbonate. The degree of conversion depends upon the amount of lime employed. With a small amount of lime, the impurities associated with the spinel type mineral of the ore become susceptible to attack by acids and alkali metal compounds, and, as the amount of lime employed is increased, the alumina of the spinel type mineral is displaced or removed and enters into combination with the excess lime.

As the amount of lime is increased, there is also a tendency for the chromium oxide to become acid soluble, and, conceivably, the entire chromic oxide content of an ore can be rendered acid-soluble through the use of lime in sufficient quantity. The progressively increasing susceptibility of the ore to attack by acids with increasing solubility of the chromic oxide through the use of progressively increased amounts of lime may be attributed to progressive alteration of the spinel type mineral of the ore with lime first causing (indirectly) displacement of the ferrous oxide, and magnesia substituting for the displaced ferrous oxide, then with alumina being abstracted more and more from the spinel type mineral until the spinel type mineral approaches or reaches the form of a true magnesium chromite (spinel) contaminated to some extent with small amounts of ferrous oxide, calcium chromite and alumina, and, ultimately with decomposition of the magnesium chromite spinel and the production of calcium chromite and other mineral bodies of indeterminate compositions. The altered spinel type mineral crystallizes in the fused product in particles of sufficient mass and sufficiently free of contamination with other minerals or compounds contained in the fused product that they may be separated and recovered from such other minerals or compounds by concentration methods employing the principle of separation by virtue of differences in specific gravities (gravity concentration methods, including for example, tabling, hindered settling and hydraulic classification) and by concentration methods employing the principle of separation by virtue of differences in affinities of chemical reagents (flotation concentration methods). The spinels and other minerals and compounds associated therewith in the fused products have different magnetic susceptibilities and, therefore, magnetic separation methods may be adopted for separation and recovery of the spinels.

The inclusion of chromium-free acid components such as alumina in charges to be subjected to the fusion treatments of the invention preferably is avoided unless provision is made for preventing introduction of such components into the altered spinel type minerals produced, as the introduction of such components into the altered minerals tends to inhibit oxidation of the chromic oxide contained therein. The preferred charges of the invention (for the fusion treatments) consist of chromite ore and a suitable basic component such as lime. When a disintegrating product is sought, silica may be included if necessary, and, if fractional reduction of displaced ferrous oxide is desired, a reducing agent such as coke may be included in the charge to be treated.

Magnesium oxide may be employed instead of calcium oxide to effect direct displacement of the ferrous oxide from the spinel type mineral, but I prefer to employ calcium oxide or calcium oxide and magnesium oxide together, rather than magnesium oxide alone because of advantages in furnace operating characteristics and the properties of the altered ore resulting from the use of lime (calcium oxide). The invention will be described hereinafter more particularly with respect to the use of lime in the fusion treatment. The lime may be employed as such in the fusion and oxidizing treatments of the invention, that is, as calcium oxide, or it may be employed in the carbonate or other form which will be converted to the oxide form in the fusion treatment and in the oxidizing treatment.

As already has been indicated, fusion of a charge containing lime and chromite ore may be carried out at a relatively low temperature of incipient fusion at which a product in the form of clinker will be produced, or, fusion of the charges may be carried out at a relatively high temperature at which a product in the form of a molten bath will be produced. Fusion treatments of the invention may be carried out in any suitable type of furnace or heating equipment. For heating charges to temperatures of incipient fusion, I prefer to employ combustion heated furnaces of the type of cement kilns, and, for heating charges to melting temperatures, I prefer to employ the submerged arc type electric furnace. Other types of combustion furnaces which may be employed for fusion include cupolas and blast furnaces.

If the lime is present in the charge in an amount less than or substantially in excess of the amount required to form di-calcium silicate, the product of the fusion treatment may not possess the property of self-disintegration. Also, if the amount of silica present in the charge is not sufficient to permit the formation of a substantial amount of di-calcium silicate, the product of the fusion treatment may not be self-disintegrating, but, on the contrary, may set from the fused state as a hard, vitreous mass when the fusion treatment is carried out at a temperature sufficiently high to form a molten product, or as hard, vitreous clinkers when the fusion treatment is carried out at a relatively low temperature of incipient fusion.

The amount of lime employed in the fusion treatment may be controlled merely to form calcium compounds of the iron oxide, alumina and silica associated with the chromic oxide of the ore and with the production of altered spinel type minerals containing substantially all of the chromic oxide of the ore, or, the amount of lime employed may be controlled to form calcium chromite with any portion or all of the chromic oxide of the ore. The alkali decomposition treatment of the invention effectively decomposes calcium compounds, such as calcium ferrite, calcium aluminate, calcium silicate and calcium chromite, formed in the fusion treatment with the production of simple oxides such as ferric oxide, alumina, silica and chromic oxide. It appears that altered spinel type minerals such as magnesium chromite produced in the fusion treatments are not decomposed to any substantial extent by the alkali decomposition treatment.

In preparing chromium-bearing materials for subsequent treatment by oxidation methods to produce chromate compounds, I may employ lime in any suitable amount. When the product of the fusion and decomposition treatments is to be subjected to an oxidation treatment without concentration, I may employ lime in such an amount as to effect the production of a self-disintegrating fused product, in an amount insufficient to effect the production of a self-disintegrating product, or in an amount in excess of the amount which will effect the production of a self-disintegrating product. When lime is employed in an amount in excess of the amount required to effect the production of a self-disintegrating product, I may provide lime in amount equivalent to or, preferably, in an amount in excess of the amount equivalent to two molecules of calcium oxide for each molecule of chromic oxide, iron oxide, aluminum oxide and silica present in the product of the fusion treatment. The use of lime in an amount in excess of that equivalent to two molecules of calcium oxide for each molecule of chromic oxide, iron oxide, aluminum oxide and silica permits the solid product of the fusion and decomposition treatments to be subjected directly to the oxidation treatment without the use of additional lime and with substantially complete conversion of the chromium to the chromate form. All of the lime required for a subsequent oxidation treatment may be added in the charge subjected to the fusion treatment or a portion may be added in the charge subjected to the fusion treatment and the remainder may be mixed with the solid product of the decomposition treatment prior to commencement of the oxidation treatment.

In view of widely different characteristics of chromite ores from various sources, it usually is advisable to conduct preliminary laboratory tests in order to determine the charge compositions and operating conditions which will produce optimum results in plant operations.

In preparing chromium-bearing materials by means of fusion treatments for subsequent treatment by concentration methods, it is advisable to employ lime in such amounts and proportions as to effect the desired alteration of the spinel with minimum conversion of the chromic oxide to the acid-soluble condition consistent with economical operation under the economic conditions peculiar to the locality in which concentration is to be carried out.

In practicing the invention, fusion of a charge comprising chromite ore and lime may be carried out under neutral, oxidizing or reducing conditions. If fusion of the charge is carried out under controlled reducing conditions, some, or even substantially all, of the iron of the displaced ferrous oxide of the ferrous chromite may be reduced preferentially to the metallic state, leaving a large proportion, or even substantially all, of the chromium unreduced. When the fusion treatment is carried out at a temperature such that the charge becomes molten, the metallic iron and the unreduced chromium may be contained in separable molten metal and slag layers, respectively, and they may be separated by procedures well known in the metallurgical art. When the fusion treatment is carried out at a relatively low temperature of incipient fusion and under reducing conditions, the metallic iron formed will be distributed in the form of small particles throughout the residual non-metallic material containing the unreduced chromium. Separation of the metal particles from the non-metallic material may be accomplished by any suitable means.

In a preferred process of my invention, I simply heat the charge comprising chromite ore and lime to a temperature of incipient fusion (cement kiln temperatures of about 1350° C. to 1500° C.) under non-reducing conditions to form an altered ore product containing all of the iron and chromium of the original chromite ore.

In another preferred process of my invention, employing reducing conditions during the fusion treatment, I practice controlled reduction, reducing the major portion of the iron of the displaced ferrous oxide and leaving unreduced the major portion of the chromium of the original ore. I thus obtain a metallic iron product relatively low in chromium and a non-metallic altered ore product beneficiated with respect to chromium by virtue of an increase in the ratio of chromium to iron resulting from the preferential or selective reduction of the iron of the original ore.

When the fusion treatment is carried out at a temperature such that the charge becomes molten, controlled reduction may be practiced by including in the charge the amount of carbonaceous material required to reduce the amount of iron sought to be reduced.

In the foregoing discussion, I have advanced a theory, which seems to be supported by experimental results, in an effort to explain the mechanism of alteration of chromite ore resulting from fusion of the ore with lime, but it is to be understood that I do not wish to be bound or limited by theoretical considerations. The results of my researches and experimentations definitely establish the fact of alteration resulting from fusion of chromite ore with lime. As the result of such fusion treatments, the iron of the ferrous oxide of chromite ore becomes more amenable to selective or preferential reduction by common reducing agents; the chromium of the chromic oxide of chromite ore becomes more readily oxidizable; the ferrous oxide of the chromite ore becomes more susceptible to attack by acids; compounds are formed which are readily decomposed into simple compounds such as oxides by treatment with an alkali metal compound such as caustic soda or sodium carbonate; and the chromic oxide becomes more amenable to recovery by ordinary concentration methods.

In processes involving melting of the charges, the original charge materials may be employed in any suitable particle sizes. In processes involving sintering (incipient fusion) of the charges, the charge materials preferably are employed in the form of particles small enough to pass a 100-mesh screen or even small enough to pass a 200-mesh screen. (Screen sizes referred to in this application are based on the Tyler series.)

In treating any of the products of fusion treatments to form concentrates, I first employ an alkali treatment to decompose the fused product, and I may follow the alkali treatment with a gravity or flotation or equivalent concentration treatment to recover a concentrate containing the altered spinel type mineral, or, I may treat the residue with acid to remove additional contaminants and form a relatively high grade chromium concentrate. Concentrates obtained by means of gravity or flotation or equivalent concentration treatments may be further treated with acid to remove contaminants and improve the grade. Excess acid and dissolved and separated matter may be washed from the residual altered mineral by means of a water treatment or any other suitable treatment. The alumina-bearing residual products of the various concentration treatments after separation of the chromium concentrates may be treated by any known method for the recovery of alumina. The fusion treatment with lime so conditions the alumina as to make it more readily recoverable by the usual alumina recovery processes involving the use of compounds of alkali metals to form alkali metal aluminates.

In treating the products with acid, I may employ any suitable acid in any suitable concentration capable of effecting the degree of decomposition sought to be accomplished. I have found hydrochloric acid and sulphuric acid to be entirely suitable. Aqueous solutions containing about ten to thirty percent (10 to 30%) hydrochloric acid (HCl) or sulphuric acid ($H_2SO_4$) can be employed to produce good results at temperatures ranging from ordinary atmospheric temperatures to boiling temperatures. Sulphuric acid treatments may be followed by roasting or fuming treatments at elevated temperatures to promote more effective decomposition of the products and subsequently to decompose or break down sulphate compounds produced.

The following example illustrates the production and recovery of a chromium concentrate and an alumina product when a fusion treatment is followed by treatment of the resulting product with an alkali metal compound:

Example I

A high-alumina ore of the following analysis was mixed with lime (CaO) in the proportions, one hundred (100) parts of ore to thirty (30) parts of lime (both by weight) and the mixture was ground to minus 100-mesh and sintered at about 1350° C. to 1500° C.:

| Ore analysis: | Per cent |
|---|---|
| $Cr_2O_3$ | 33.00 |
| FeO | 13.90 |
| $Al_2O_3$ | 31.48 |
| $SiO_2$ | 4.71 |
| MgO | 11.56 |
| CaO | 2.40 |

The sintered product in finely divided condition, was boiled at atmospheric pressure with an aqueous solution of caustic soda (NaOH) containing about 25 to 30 percent by weight of caustic soda. A solution containing about 75 percent of the alumina in the form of sodium aluminate was obtained upon boiling for about 20 minutes. The sodium aluminate solution was separated from the undissolved residue and treated according to a known method for the recovery of substantially pure alumina with regeneration of the caustic soda.

The residue remaining after separation of the sodium aluminate solution was treated with acid to remove soluble lime and iron oxide. The acid-treated residue, amounting to 51.7 percent by weight of the sintered product, analyzed as follows:

| Concentrate analysis: | Per cent |
|---|---|
| $Cr_2O_3$ | 42.2 |
| FeO | 11.0 |
| $SiO_2$ | 1.5 |
| $Al_2O_3$ | 8.7 |
| CaO | 2.5 |
| MgO | 17.2 |

In practicing a process of the invention involving the treatment of a fusion product with caustic soda, of the type illustrated above, a saving in acid may be effected by subjecting the residue remaining after separation of the sodium aluminate solution to a water concentration treatment to remove or separate silica and the hydroxides of iron and calcium.

The following example illustrates a process of the invention employing sodium carbonate as the alkali metal compound in the decomposition treatment and in which the product of the decomposition treatment is subjected to a gravity concentration treatment to produce a chromium concentrate:

Example II

| Ore analysis: | Per cent |
|---|---|
| $Cr_2O_3$ | 44.00 |
| FeO | 23.60 |
| $Al_2O_3$ | 13.80 |
| $SiO_2$ | 6.20 |
| MgO | 8.30 |
| CaO | 3.02 |

To 100 parts of ore of the above composition, I added 50 parts lime stone (53% CaO), both the ore and lime stone being crushed preferably to minus 100-mesh, and sintered at about 1300° C. The sintered product, in finely divided form, was then decomposed by boiling with sodium carbonate solution, containing about twenty percent of sodium carbonate, by weight in a non-oxidizing environment. After boiling for approximately 1 hour, the solution was filtered from the residue. The residue which consisted of flocculated oxides of iron, lime, alumina and silica and altered crystals of chromite was then concentrated by water concentration to produce a concentrate of chromite and a tailing product containing waste oxides. The concentrate produced analyzed 47% $Cr_2O_3$ and 10.3% Fe which gives a Cr to Fe ratio of 3.12:1 as compared to 1.65:1 in the original ore.

The following example illustrates a process of the invention employing sodium carbonate for decomposition and in which the product of the decomposition treatment is subjected directly (without concentration) to an oxidizing treatment to produce chromate:

Example III 100 parts of ore of the composition shown in Example II above (minus 100-mesh) and 100 parts of lime stone (minus 100-mesh) were mixed and sintered at about 1300° C. The sinter was ground to pass a 100-mesh screen and digested with twenty percent (20%) sodium carbonate ($Na_2CO_3$) solution. Digestion was carried out at a boiling temperature in a closed vessel.

To the residue from the decomposition after filtration, I added 30 parts of lime stone (minus 100-mesh) and 17.5 parts of soda ash and roasted or oxidized at about 850° C. to 1000° C. for one and one-half hours. The conversion to chromate was approximately ninety-five percent (95%). The tendency to sinter and prevent oxidation was almost entirely eliminated.

The following example shows results obtained in a process for producing chromates employing preliminary fusion of chromite ore with lime but omitting the alkali decomposition step of the process of the present invention:

Example IV 100 parts of ore of the composition of that employed in Examples II and III above (minus 100-mesh) were mixed with 100 parts of lime stone (minus 100-mesh and 53% CaO) and sintered at about 1300° C. The sintered product was ground to minus 100-mesh with 150 parts of lime stone and 17.5 parts of soda ash and oxidized at 850° C. to 100° C. for one and one-half hours. The conversion to chromate was approximately 82%.

The advantages of the decomposition treatment of the invention in conditioning the product of the fusion treatment for oxidation will be apparent from a comparison of the results obtained in the procedures of Examples III and IV above. In the procedure of Example III employing decomposition following fusion and with other conditions the same as in Example IV, ninety-five percent conversion to chromate was accomplished as compared with eighty-two percent conversion in carrying out the procedure of Example IV.

A further advantage of the decomposition treatment of the invention resides in the fact that effective conversion to chromate may be accomplished with the use of relatively small amounts of soda ash, lime in the charge providing the base for combination with the chromium trioxide produced. Effective conversion to chromate may be accomplished with charges comprising the decomposed product, lime and soda ash in which the amount of soda ash does not exceed that required for forming sodium chromate with about ten percent of the chromium of the charge. Charges containing soda ash in amount equal to that required for forming sodium chromate with about fifty percent of the charge may be oxidized readily and substantially completely. The use of relatively small amounts of soda ash in oxidation charges is highly advantageous because of elimination of fusing and balling difficulties encountered in oxidation of charges containing large amounts of soda ash.

I may treat the products of the fusion and decomposition treatments and the concentrates by any method known to the art of chromate production in order to effect oxidation of the chromium, and I may recover the oxidized chromium by any method known to the art of chromium recovery. The oxidized chromium may be recovered, for example (either as an intermediate product or as a final product), as chromite, chromate or bichromate of any suitable composition.

In treating the products of the fusion and decomposition treatments directly to produce chromates, I prefer to form finely divided admixtures of the products with lime or lime and soda ash and roast the mixtures in air at temperatures above about 750° C. and below about 1000° C. until the desired degree or amount of conversion to chromate has been effected. I may employ lime and soda ash in any desired proportions, depending upon the end product sought to be obtained. If a calcium chromate product is sought, I employ lime sufficient to form calcium chromate with all of the chromium in the product of the decomposition treatment together with a small amount of soda ash (1 to 5 percent by weight) to catalyze the oxidation reaction. The calcium chromate may be recovered from the product of the oxidation treatment by leaching with water or preferably with water containing sulphuric acid in solution. The calcium chromate may be recovered from the leaching liquor by evaporation and crystallization or by precipitation with calcium hydroxide to effect practically complete precipitation of calcium chromate. If an alkali metal bichromate is sought, I may employ soda ash sufficient to form sodium chromate with about half of the chromium present and lime in excess of that required to form calcium chromate with the remainder of the chromium. A solution containing sodium bichromate may be obtained by leaching the product of the roasting treatment with water containing sulphuric acid.

The concentrate products may be treated similarly to the direct products of the fusion and decomposition treatments for the production and recovery of chromates. In a preferred process of the invention, I roast the concentrate products with lime sufficient to form calcium chromate with all of the chromium present and thus convert substantially all of the chromium to calcium chromate. In effecting such a conversion, I prefer to roast the concentrate in air in the form of a finely divided admixture with lime (or lime and a small amount of soda ash) at a temperature below 1000° C. and above 750° C. to convert the magnesium chromite to calcium chromate. A product thus formed may be treated for the recovery of a relatively pure chromate compound of any desired composition.

Certain features of the disclosure of this application not claimed herein are disclosed and claimed in my copending applications Serial No. 244,697, filed December 8, 1938, now Patent No. 2,256,536, dated September 23, 1941; Serial No. 252,743, filed January 26, 1939, now Patent No. 2,359,697, dated October 3, 1944; Serial No. 401,297, filed July 5, 1941, and Serial No. 447,963, filed June 22, 1942.

In my Patent No. 2,359,697 I claimed broadly the formation of the altered or substituted chromite and its subsequent oxidation to chromate. In my copending application, Serial No. 401,297, I claim the decomposition of the altered or substituted chromite in the presence of an oxygen-containing gas so that a portion of the chromium thereof is oxidized to chromate. In my copending application, Serial No. 447,963, I claim the oxidation, in the presence of an alkali metal compound, of the solid residue resulting from the digestion of the altered chromite with an aqueous solution of an alkali metal compound, to convert the chromium contained therein to an alkali metal compound of chromium containing chromium in the hexavalent state, and reducing the alkali metal compound of chromium to produce chromic oxide.

I claim:

1. The method of recovering chromium which comprises forming a charge comprising chromium-bearing material containing ferrous chromite and a basic compound of the group consisting of lime and magnesia capable of substituting for the ferrous oxide of the ferrous chromite to displace the ferrous oxide from chemical combination with the chromic oxide of the ferrous chromite and form an altered chromite, heating the charge to a temperature above 1200° C., and at least sufficiently high to cause sintering of constituents of the charge and to produce a product containing an altered chromite formed by substitution of the basic compound for ferrous oxide of the chromite of the original chromium-bearing material, digesting the altered or substituted chromite in a hot aqueous solution of an alkali-metal compound from the class consisting of sodium hydroxide and soda ash with resultant production of a solid residue in which most of the chromium thereof still is in the form of chromite, and recovering said residue.

2. The method of recovering chromium which comprises forming a charge comprising chromium-bearing material containing ferrous chromite and a basic compound of the group consisting of lime and magnesia capable of substituting for the ferrous oxide of the ferrous chromite to displace the ferrous oxide from chemical combination with the chromic oxide of the ferrous chromite and form an altered chromite, heating the charge to a temperature above 1200° C., and at least sufficiently high to cause a sintering of constituents of the charge and to produce a product containing an altered chromite formed by substitution of the basic compound for ferrous oxide of the chromite of the original chromium-bearing material, digesting the altered or substituted chromite in a hot aqueous solution of sodium hydroxide with resultant production of a solid residue in which most of the chromium thereof still is in the form of chromite, and recovering said residue.

3. The method of recovering chromium which comprises forming a charge comprising chromium-bearing material containing ferrous chromite and a basic compound of the group consisting of lime and magnesia capable of substituting for the ferrous oxide of the ferrous chromite to displace the ferrous oxide from chemical combination with the chromic oxide of the ferrous chromite and form an altered chromite, heating the charge to a temperature above 1200° C., and at least sufficiently high to cause a sintering of constituents of the charge and to produce a product containing an altered chromite formed by substitution of the basic compound for ferrous oxide of the chromite of the original chromium-bearing material, digesting the altered or substituted chromite in an aqueous solution of sodium hydroxide containing not less than about 10% by weight of sodium hydroxide at a boiling temperature with resultant production of a solid residue in which most of the chromium thereof still is in the form of chromite, and recovering said residue.

4. The method of recovering chromium which comprises forming a charge comprising chromium-bearing material containing ferrous chromite and a basic compound of the group consisting of lime and magnesia capable of substituting for the ferrous oxide of the ferrous chromite to displace the ferrous oxide from chemical combination with the chromic oxide of the ferrous chromite and form an altered chromite, heating the charge to a temperature above 1200° C., and at least sufficiently high to cause a sintering of constituents of the charge and to produce a product containing an altered chromite formed by substitution of the basic compound for ferrous oxide of the chromite of the original chromium-bearing material, digesting the altered or substituted chromite in a hot aqueous solution of soda ash with resultant production of a solid residue in which most of the chromium thereof still is in the form of chromite, and recovering said residue.

5. The method of recovering chromium which comprises forming a charge comprising chromium-bearing material containing ferrous chromite and a basic compound from the group consisting of lime and magnesia capable of substituting for the ferrous oxide of the ferrous chromite to displace the ferrous oxide from chemical combination with the chromic oxide of the ferrous chromite and form an altered chromite, heating the charge to produce a sintered product containing an altered chromite formed by substitution of the basic compound for ferrous oxide of the chromite of the original chromium-bearing material, digesting the altered or substituted chromite in a hot aqueous solution of an alkali-metal compound from the class consisting of sodium hydroxide and soda ash with resultant production of solid residue in which most of the chromium thereof still is in the form of chromite, and recovering said residue.

6. The method of recovering chromium which comprises forming a charge comprising chromium-bearing material containing ferrous chromite and a basic compound from the group consisting of lime and magnesia capable of substituting for the ferrous oxide of the ferrous chromite to displace the ferrous oxide from chemical combination with the chromic oxide of the ferrous chromite and form an altered chromite, heating the charge to produce a molten product containing an altered chromite formed by substitution of the basic compound for ferrous oxide of the chromite of the original chromium-bearing material, digesting the altered or substituted chromite in a hot aqueous solution of an alkali metal compound from the class consisting of sodium hydroxide and soda ash with resultant production of a solid residue in which most of the chromium thereof still is in the form of chromite, and recovering said residue.

7. The method of recovering chromium which comprises forming a charge comprising chromium-bearing material containing ferrous chromite and a basic compound of the group consisting of lime and magnesia capable of substituting for the ferrous oxide of the ferrous chromite to displace the ferrous oxide from chemical combination with the chromic oxide of the ferrous chromite and form an altered chromite, heating the charge to a temperature above 1200° C., and at least sufficiently high to cause a sintering of constituents of the charge and to produce a product containing an altered chromite formed by substitution of the basic compound for ferrous oxide of the chromite of the original chromium-bearing material, digesting the altered or substituted chromite in a hot aqueous solution of an alkali metal compound from the class consisting of sodium hydroxide and soda ash with the resultant production of a solid residue in which most of the chromium thereof is in the form of chromite, separating the aqueous liquid from the solid residue and oxidizing the chromium of the residue.

8. The method of recovering chromium which comprises forming a charge comprising chromium-bearing material containing ferrous chromite and a basic compound of the group consisting of lime and magnesia capable of substituting for the ferrous oxide of the ferrous chromite to displace the ferrous oxide from chemical combination with the chromic oxide of the ferrous chromite and form an altered chromite, heating the charge to a temperature above 1200° C., and at least sufficiently high to cause a sintering of constituents of the charge and to produce a product containing an altered chromite formed by substitution of the basic compound for ferrous oxide of the chromite of the original chromium-bearing material, digesting the altered or substituted chromite in a hot aqueous solution of an alkali metal compound from the class consisting of sodium hydroxide and soda ash with resultant production of a solid residue in which most of the chromium thereof still is in the form of chromite, separating the aqueous liquid from the solid residue, and oxidizing the chromium of the residue to chromate.

9. The method of recovering chromium which comprises forming a charge comprising chromium-bearing material containing ferrous chromite and lime, heating the charge to a temperature above 1200° C., and at least sufficiently high to cause a sintering of constituents of the charge and to produce a product containing an altered chromite formed by substitution of the lime for ferrous oxide of the chromite of the original chromium-bearing material, digesting the altered chromite in a hot aqueous solution of an alkali-metal compound from the class consisting of sodium hydroxide and soda ash with resultant production of a solid residue in which most of the chromium thereof still is in the form of chromite, separating the aqueous liquid from the solid residue, and heating a charge including said solid residue and a compound from the class consisting of lime and soda ash in the presence of an oxygen-containing gas to oxidize the chromium of the residue.

10. The method of recovering chromium which comprises forming a charge comprising chromium-bearing material containing ferrous chromite and lime, heating the charge to a temperature above 1200° C. and at least sufficiently high to cause a sintering of constituents of the charge and to produce a product containing an altered chromite formed by substitution of the lime for ferrous oxide of the chromite of the original chromium-bearing material, digesting the altered chromite in a hot aqueous solution of an alkali metal compound from the class consisting of sodium hydroxide and soda ash with resultant production of a solid residue in which most of the chromium thereof still is in the form of chromite, separating the aqueous liquid from the solid residue, and heating a charge including said solid residue, lime and soda ash in the presence of an oxygen-containing gas to oxidize the chromium of the residue to chromate.

11. The method of recovering chromium which comprises forming a charge comprising chromium-bearing material containing ferrous chromite and lime, heating the charge to a temperature above 1200° C. and at least sufficiently high to cause a sintering of constituents of the charge and to produce a product containing an altered chromite formed by substitution of the lime for ferrous oxide of the chromite of the original chromium-bearing material, digesting the altered chromite in a hot aqueous solution of an alkali metal compound from the class consisting of sodium hydroxide and soda ash with resultant production of a solid residue in which most of the chromium thereof still is in the form of chromite, separating the aqueous liquid from the solid residue, and heating a charge including said solid residue and soda ash in the presence of an oxygen-containing gas to oxidize the chromium of the residue to chromate.

12. The method of recovering chromium which comprises forming a charge comprising chromium-bearing material containing ferrous chromite and lime, heating the charge to a temperature above 1200° C. and at least sufficiently high to cause a sintering of constituents of the charge and to produce a product containing an altered chromite formed by substitution of the lime for ferrous oxide of the chromite of the original chromium-bearing material, digesting the altered chromite in a hot aqueous solution of an alkali metal compound from the class consisting of sodium hydroxide and soda ash with resultant production of a solid residue in which most of the chromium thereof still is in the form of chromite, separating the aqueous liquid from the solid residue, and heating a charge including said solid residue, lime and soda ash in the presence of an oxygen-containing gas to oxidize the chromium of the residue to chromate, the soda ash in said last mentioned charge being in amount not substantially more than that required for forming sodium chromate with 10% of the chromium of said charge.

13. The method of recovering chromium which comprises forming a charge comprising chromium-bearing material containing ferrous chromite and a basic compound of the group consisting of lime and magnesia capable of substituting for the ferrous oxide of the ferrous chromite to displace the ferrous oxide from chemical combination with the chromic oxide of the ferrous chromite and form an altered chromite, heating the charge to a temperature above 1200° C., and at least sufficiently high to cause a sintering of constituents of the charge and to produce a product containing an altered chromite formed by substitution of the basic compound for ferrous oxide of the chromite of the original chromium-bearing material, digesting the altered or substituted chromite in a hot aqueous solution of an alkali metal compound from the class consisting of sodium hydroxide and soda ash with resultant production of a solid residue in which most of the chromium thereof still is in the form of chromite, separating the aqueous liquid from the solid residue, concentrating said residue to produce a concentrate high in chromium, and oxidizing the chromium of the concentrate to produce chromate.

14. The method of recovering chromium which comprises forming a charge comprising chromium-bearing material containing ferrous chromite and a basic compound of the group consisting of lime and magnesia capable of substituting for the ferrous oxide of the ferrous chromite to displace the ferrous oxide from chemical combination with the chromic oxide of the ferrous chromite and form an altered chromite, heating the charge to a temperature above 1200° C., and at least sufficiently high to cause a sintering of constituents of the charge and to produce a product containing an altered chromite formed by substitution of the basic compound for ferrous oxide of the chromite of the original chromium-bearing material, digesting the altered or substituted chromite in a hot aqueous solution of an alkali metal compound from the class consisting of sodium hydroxide and soda ash with resultant production of a solid residue in which most of the chromium thereof still is in the form of chromite, separating the aqueous liquid from the solid residue, treating the separated solid residue with a mineral acid to remove contaminates and to form a relatively high-grade chromium concentrate, and oxidizing the chromium of said concentrate.

15. The method of recovering chromium which comprises forming a charge comprising chromium-bearing material containing ferrous chromite and lime, heating the charge to a temperature above 1300° C. and at least sufficiently high to cause a sintering of constituents of the charge and to produce a product containing an altered chromite formed by substitution of the lime for ferrous oxide of the chromite of the original chromium-bearing material, digesting the altered or substituted chromite in a hot aqueous solution of an alkali metal compound from the class consisting of sodium hydroxide and soda ash with resultant production of a solid residue in which most of the chromium thereof still is in the form of chromite, separating the aqueous liquid from the solid residue, and oxidizing the chromium of the residue at a temperature below 1000° C. to form chromate.

16. The method of recovering chromium which comprises forming a charge comprising chromium-bearing material containing ferrous chromite and lime, heating the charge to a temperature between about 1300° C. and 1500° C. and at least sufficiently high to cause a sintering of constituents of the charge and to produce a product containing an altered chromite formed by substitution of the lime for ferrous oxide of the chromite of the original chromium-bearing material, digesting the altered or substituted chromite in a hot aqueous solution of an alkali metal compound from the class consisting of sodium hydroxide and soda ash with resultant production of a solid residue in which most of the chromium thereof still is in the form of chromite, separating the aqueous liquid from the solid residue, and oxidizing the chromium of the residue at a temperature below 1000° C. to form chromate.

MARVIN J. UDY.